E. E. FITZ.
Mounting and Attachment for Terrestrial Globes.
No. 9,557. Reissued Feb. 8, 1881.
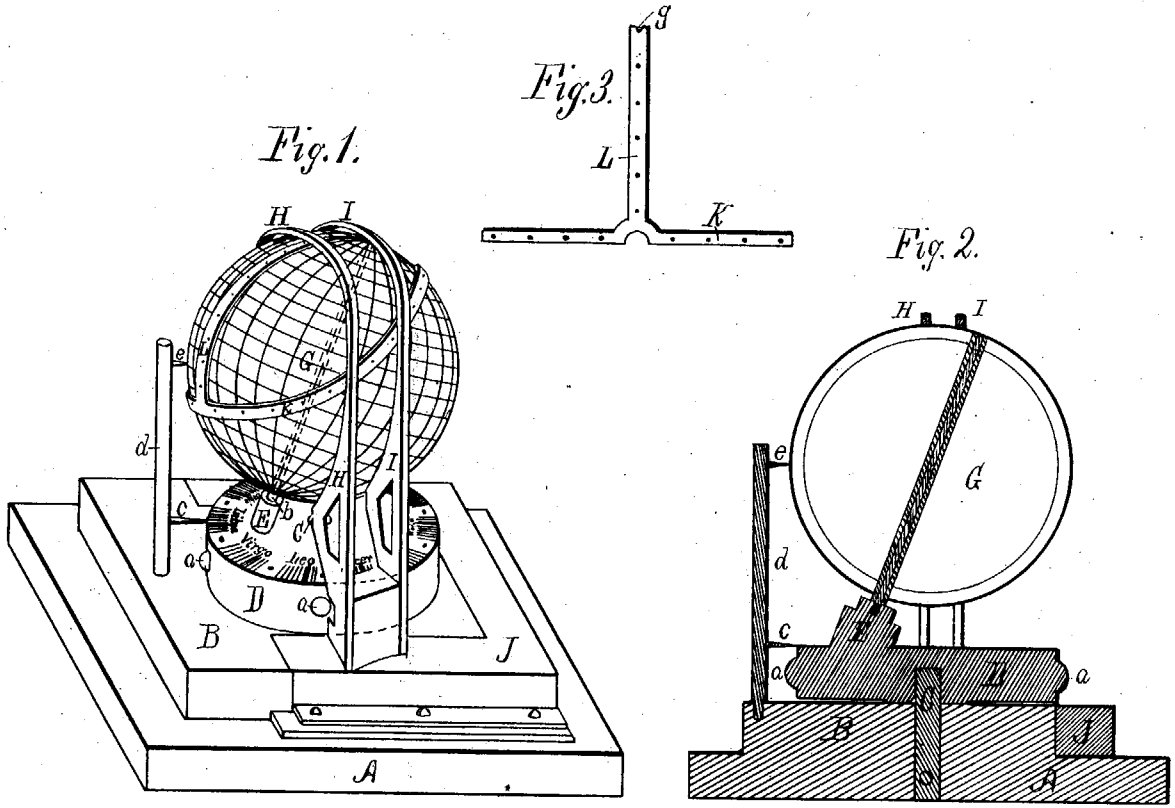
Witnesses,
Geo. T. Ogle
H. E. Lodge
Inventor,
E. E. Fitz.
F. Curtis, Atty.
N. PETERS, PHOTO-LITHOGRAPHER, WASHINGTON, D. C.

UNITED STATES PATENT OFFICE.

ELLEN E. FITZ, OF ST. JOHN, NEW BRUNSWICK, CANADA.

MOUNTING AND ATTACHMENT FOR TERRESTRIAL GLOBES.

SPECIFICATION forming part of Reissued Letters Patent No. 9,557, dated February 8, 1881.

Original No. 158,581, dated January 12, 1875. Application for reissue filed May 29, 1879.

*To all whom it may concern:*

Be it known that I, ELLEN E. FITZ, of St. John, New Brunswick, have invented a Method of Mounting and Operating Globes, of which the following is a specification.

The purpose of my invention is to provide an instrument or apparatus for use in schools, families, &c., to illustrate and explain the manner in which the earth, in accordance with its diurnal and annual motion, presents its surface to the sun's rays, my especial object being to ascertain the various durations of day, night, and twilight throughout the year at any given terrestrial positions or localities, and also, in treating of day, to ascertain the points of the rising, setting, and culmination of the sun and the various courses the latter pursues in its relation to different horizons.

The drawings accompanying this specification represent, in Figure 1, a perspective view of an instrument or apparatus embodying my improvements, Fig. 2 being a vertical section of the same, taken through the supporting-post or axis of revolution of the globe.

In carrying out the objects I have in view I provide a flat tablet or base-plate, A, of suitable size and material, usually of wood, and upon the top of this tablet I add or create, for convenience of manufacture, a lesser plate or extension, B. Upon the plate B, I erect a perpendicular post, C, which constitutes an axis or point of revolution to a horizontal disk or cylinder, D, which is disposed upon the top of the plate B, and practically centrally thereof, the said disk turning freely upon its pivot C, and being preferably provided with knobs *a a*, which stud its periphery, by which its revolution may be facilitated. Upon the upper surface or plane of the disk B, and to one side of the center of the same, I erect a post or rod, E, which slopes inward toward and beyond the center of such disk at an angle of twenty-three and one-half degrees (or at such an angle that a prolongation of the pivot or axis of the disk shall intersect the center of the globe) with the plane of the disk, such rod constituting the axis about which the globe G revolves, and being formed with a shoulder, *b*, to maintain such globe at some altitude above the disk B, the diameter of the rod immediately outside of the globe being as small as is practicable, in order to obscure the south pole of the globe as little as possible.

H I in the accompanying drawings represent two arched standards, which span the globe, and are erected upon the plate B, with their feet upon opposite sides of the latter, and these standards approach the south pole of said globe upon each side as nearly as may be, and allow space for the passage of post E as it rotates past them. The standards H I serve to separate the two hemispheres which denote day and night upon the earth's surface, the former, H, representing the circle of illumination upon the earth's surface and the latter the circle which divides the section of the earth's surface within total night from that in twilight, the former phase being shown to the right of the standard I, and that in twilight between the two standards. As the standards H I cannot, owing to the passage of the post E, completely encircle the globe, the circle of illumination is necessarily incomplete or broken for a short distance upon either side of the south pole; but this defect is unimportant. As the globe is to be manipulated at certain times without the aid of these standards, I prefer that at such times they should be removed from close contact with said globe, and to this end I dispose them upon a frame, J, which slides horizontally upon the plate B, and by means of which they may be moved into action in the position shown in the drawings, or removed a short distance therefrom when not needed.

Upon the upper surface of the disk D, and immediately about its periphery, I inscribe a scale of divisions, which divides the said disk into twelve equal intervals, these divisions representing the imaginary plane of the ecliptic or orbit of the earth about the sun, the names of the signs of the ecliptic being added, as represented in the drawings. These twelve divisions are, in turn, each subdivided into ten equal divisions, which embrace or represent three days each, the first day of the month within each sign being indicated by an additional mark, which extends nearer the axis of the disk than the others, as the signs of the ecliptic do not reckon from the first day of the calendar month, but from the first day of the month upon which the equinoxes and solstices occur. The degree of any sign in which the sun may be situated upon any given date may also be reckoned by means of the subdivisions of the scale upon the disk D. For instance, when the pointer *c* (to be hereinafter explained) points to the first mark within Scorpio the sun has entered the fourth degree of said sign, to the second mark of Scorpio the seventh degree, and so on, as the beginning of a sign, as before stated, takes date from the first instead of the twenty-first in reckoning degrees in lieu of days upon the scale.

In order to represent the passage of the sun through the signs of the ecliptic, or of the earth through the months of the year, I employ a pointer composed of a pointed rod or pin, *c*, which projects horizontally inward into close proximity to the disk from a vertical post, *d*, erected upon the plate B, and operates, in connection with the scale of divisions, upon the disk D, while, in order to represent the direction of the sun from the earth, or the situation of the sun with regard to the earth's surface—that is, the sun's vertical rays on the earth's surface—I employ a second pointed pin, *e*, likewise projecting inward from the top of the post *d* and coincident with the path of movement of the globe, or midway of the hemisphere of the latter, which denotes the illuminated half of the earth's surface, the pin or needle *e* also indicating the sun's vertical rays upon the earth's surface.

It will be observed that as the disk D revolves, the rod E (which serves as an axis to the globe) describes a path of the form of a cone, while the globe itself occupies a given position in space which, theoretically and literally, is not a correct representation of the annual motion of the earth, as the latter body is constantly moving forward in its orbit round the sun with its axis fixed in one direction; but this difference of motion between the true one of the earth and that of the globe intending to represent it is attendant with no difference in the movement of their surfaces—the former before the sun and the latter before an object representing such sun, as shown by the index-pointer *e*, which, as before stated, is coincident with the center of the globe G. My present instrument does practically exhibit the difference of motion in the surfaces of the earth before the sun, as I am enabled, by confining my apparatus to the purposes hereinbefore premised, to construct it with much greater simplicity than would be possible did I intend it as a planetarium—an instrument which mine is in no sense expected to supplant.

In order to obtain an adjustable device for readily defining and illustrating any required horizon, I employ a ring, K, of thin metal, which closely fits the greatest diameter of the globe G, and is divided upon its outer face into a scale of divisions of any desired number of degrees. While spanning this ring centrally thereof and at right angles to its plane I employ a semicircular band, L, also of thin metal, which is similarly provided with a graduated scale upon its outer surface, this semicircular band being intended to represent a semimeridian at any point upon the globe with which a central perforation, *g*, of the said band may coincide. As the standards H I and the horizon-ring K are not to be brought into use at one and the same time, the latter should be removed and laid carefully to one side while the standards are in use, and when the ring is in use the standards, by means of the sliding frame J, are to be removed from immediate proximity to the globe. By this means I avoid injury to either the standards or ring, which might otherwise ensue on rotating the globe with the latter affixed to it. By means of the standards H I, which, as before stated, separate the two hemispheres representing day and night, we can illustrate the seasons, ascertain clock time, define twilight in its various phases, compute length of day and night, &c.

The diurnal course of the sun is ascertained by the ring K, as the passage of the pointer or needle *e* above it denotes the sun's diurnal course above the horizon of the given place, and by so adapting the band L to the globe that it corresponds with the meridian of this given place and its perforation or peep-hole *g* is coincident with such place the course of the the sun with respect to the horizon is obtained.

My present instrument, as before briefly stated, has two motions—one a revolution of the disk D about the pivot C, which is intended to represent the passage of the sun through the signs of the ecliptic, and therefore of the earth through the months of the year, and the second a revolution of the globe G about the rod E, which is to represent the passage of the earth's surface through day, twilight, and night.

The half of the globe G nearest or adjacent to the pointer indicating the sun's vertical rays or index *e* denotes the hemisphere of the earth's surface which is in day, and the opposite half that which is in night.

When the globe is to be revolved into a given time of year it is to be moved bodily by and with the disk D, which latter is rotated upon its axis C. When the globe is to be revolved for the purpose of describing the daily course of the sun it is to be rotated upon its axis E, the disk D remaining stationary. It requires one diurnal revolution of the earth to complete a vertical illumination, to which allusion has previously been made in this specification, and whenever a circle upon the earth's surface is said thus to be illuminated vertically it should be borne in mind that but one position within this circle is illuminated at any one instant.

As an instance of the value and practicability of my system in this respect, revolve the disk D a number of times and it will be observed that the frigid zones continually pass to their full extent into one or the other of the hemispheres upon either side of the center of illumination, and a vertical sun (which in my instrument is represented by the needle *e*) continually travels to and fro of the torrid zone, each movement necessitating one-half a revolution of the disk to complete it, or occupying six months of time. Thus the operator or student cannot fail to see that the five zones are natural divisions of the earth's surface, and not the artificial and arbitrary ones of the geographer, and he is enabled to readily distinguish the prevailing climates of such earth's surface. When it is not convenient to count the intervals upon a southern parallel they may be counted upon the corresponding northern parallel upon the opposite side of the circle of illumination, day upon the latter being of the same length as night upon the former, and vice versa. As the axis or rod E upon which the globe rests and rotates occupies a space of a few degrees about the south pole, the horizon-ring K cannot, under the construction shown in the accompanying drawings, be adjusted to represent the horizon of any situation upon the equator, or upon any parallel to either side of it, within the distance occupied by the rod E; but the horizon of any situation upon the equator may be represented by the meridian that is ninety degrees distant, while there will be but a slight variation in the course of the sun in the zone comprised within a few degrees upon either side of the equator. This objection, however, may be remedied, wholly or in part, by creating a notch in the ring K to receive the base of the rod E and permit the edge of the ring to coincide with the center of the globe.

For the full details of the working of my system reference must, of course, be had to the manual which I have prepared to accompany it, as it would manifestly be too prolix and unnecessary to make part of this specification. It may, however, be well, in this connection, to instance several examples of such working. For instance, see the following problem and its solution: Required to trace the course of the sun at Spitzbergen upon the 21st day of June, it being known that upon the 21st day of June the sun describes its whole diurnal course above the horizon at Spitzbergen, ascending from its lowest position, or twelve degrees above the northern point of the horizon, to thirty-five degrees above the southern point thereof, and again descending to its lowest position. Having adjusted the horizon-ring hereinbefore named to the situation of Spitzbergen, which is done by adapting the peep-hole *g* to the locality of said place, with the band L in the direction of the meridian of said place, and brought the globe into position for June 21, I ascertain, by rotating the said globe through one revolution upon its axis, that the sun describes its whole diurnal course above the represented horizon upon the given date, and therefore I start with the pointer opposite the band L, upon the side which describes the shortest distance to the ring, this distance being twelve degrees, and denoting the nearest approach of the sun to the horizon of Spitzbergen during the twenty-four hours of June 21. The globe being now rotated toward the left, the pointer gradually ascends to thirty-five degrees upon the semi-meridian of Spitzbergen, and then again descends to its lowest position, thereby giving the required course of the sun to be performed in a similar manner.

Again, upon the subject of twilight, I give the following brief example, and would preface it by the remark that, for the sake of convenience in the practice upon the globe when considering this subject of twilight, I prefer to call the lesser standard, I, the "twilight-circle." Required to ascertain the beginning, duration, and ending of twilight at Stockholm upon June 21, it being known that parallels have a twilight continuing through the night when their illuminated arc is contained wholly within the section of twilight. I first revolve the globe into position for June 21, as before stated, and then backward in the year until the parallel of Stockholm has its point most remote from the sun within the twilight-circle, at which time the index *c* is opposite April 26. I now revolve the globe forward in the year until the parallel of Stockholm again rests its point most remote from the sun within the twilight-circle, when I find the index opposite August 24. A season of twilight continuing through the night therefore begins at Stockholm on the 26th day of April and terminates on the 24th day of August, or continues during an entire period of four months.

To carry any given place forward in the day the globe G should be rotated from left to right, and to pass the signs on disk D forward said disk must be rotated from the left to the right also.

I claim—

1. In combination with a terrestrial globe, a fixed point in proximity to said globe, representing the sun, and a horizon-ring movable upon said globe, substantially as set forth.

2. The combination of a terrestrial globe having motions illustrating diurnal and annual rotation with a twilight-circle independent of the horizon and capable at all times of illustrating twilight without abnormal movement of said globe.

3. The combination of a terrestrial globe rotating on a suitably-inclined axis with a rotating disk, graduated as described, which carries said axis, arched standards representing the lines of light and of darkness, and a pointer which points to the graduations on the disk, for the purpose set forth.

4. A terrestrial globe illustrating both the diurnal and annual motions of the earth, in combination with a fixed sun-point, said globe being provided with a removable horizon-ring and twilight-circle, substantially as set forth.

ELLEN E. FITZ.

Witnesses:
F. CURTIS,
H. E. LODGE.